(12) United States Patent
Gonsalves

(10) Patent No.: US 8,793,268 B1
(45) Date of Patent: Jul. 29, 2014

(54) SMART KEY ACCESS AND UTILIZATION TO OPTIMIZE DATA WAREHOUSE PERFORMANCE

(76) Inventor: Allan Michael Gonsalves, San Jose, CA (US)

( * ) Notice: Subject to any disclaimer, the term of this patent is extended or adjusted under 35 U.S.C. 154(b) by 511 days.

(21) Appl. No.: 12/828,433

(22) Filed: Jul. 1, 2010

(51) Int. Cl.
*G06F 17/30* (2006.01)

(52) U.S. Cl.
USPC .......................... 707/760; 707/771; 707/606

(58) Field of Classification Search
CPC .................. G06F 17/30563; G06F 17/30592; G06F 17/30292; G06F 17/30; G06F 17/30595; G06F 17/30477; G06F 17/30424; G06F 17/30501
USPC .................................. 707/600–606, 705–757
See application file for complete search history.

(56) References Cited

U.S. PATENT DOCUMENTS

| | | | |
|---|---|---|---|
| 5,940,818 A * | 8/1999 | Malloy et al. | 1/1 |
| 6,233,573 B1 * | 5/2001 | Bair et al. | 1/1 |
| 6,847,973 B2 * | 1/2005 | Griffin et al. | 1/1 |
| 7,099,882 B2 * | 8/2006 | McDonough | 340/990 |
| 7,320,001 B1 * | 1/2008 | Chen | 1/1 |
| 7,921,330 B2 * | 4/2011 | Riemers | 714/20 |
| 7,970,728 B2 * | 6/2011 | Honzal et al. | 707/600 |
| 7,979,475 B2 * | 7/2011 | Mack | 707/803 |
| 8,171,037 B1 * | 5/2012 | Steen et al. | 707/756 |
| 2005/0010550 A1 * | 1/2005 | Potter et al. | 707/1 |
| 2007/0027860 A1 * | 2/2007 | Bestgen et al. | 707/5 |
| 2007/0061287 A1 | 3/2007 | Le et al. | |
| 2007/0118524 A1 | 5/2007 | Farmer | |
| 2007/0136323 A1 * | 6/2007 | Zurek et al. | 707/100 |
| 2008/0027966 A1 * | 1/2008 | Parees et al. | 707/102 |
| 2009/0055439 A1 * | 2/2009 | Pai et al. | 707/200 |

OTHER PUBLICATIONS

Boedeker, Christer "Automated Presentation of Slowly Changing Dimension", Uppsala University, Disciplinary Domain of Science and Technology, Mathematics and Computer Science, Department of Information Technology, series IT 09 025, 2009.*

* cited by examiner

*Primary Examiner* — Michelle Owyang
(74) *Attorney, Agent, or Firm* — Douglas L. Weller

(57) ABSTRACT

In a data warehouse, a master table includes surrogate identifiers. Each surrogate identifier (SID) uniquely identifies a master table domain within the master table. A dimension table uses the surrogate identifiers to link to the master table domains. A SID generator uses first data supplied in a user query to generate a first SID indicating location of a particular master table domain in the master table. The SID generator generates the first SID without accessing the master table.

17 Claims, 5 Drawing Sheets

SMART KEY ACCESS AND UTILIZATION TO OPTIMIZE DATA WAREHOUSE PERFORMANCE

BACKGROUND

A data warehouse is a repository of an organization's electronically stored data, designed to facilitate reporting and analysis. It is also a nonvolatile data repository that houses large amounts of historical data. Data warehousing and associated processing mechanisms, such as Online Analytical Processing (OLAP), Relational OLAP (ROLAP), Multidimensional OLAP (MOLAP), and Hybrid OLAP (HOLAP), are common technologies used to support business decisions and data analysis. There are two leading approaches used to store data in a data warehouse—the dimensional approach and the normalized approach.

In a dimensional approach, transaction data are partitioned into either "facts", which are generally numeric transaction data such as net sales, quantity sold, gross sales, etc, or "dimensions", which are the reference information that gives context to the facts. In the normalized approach, the data in the data warehouse are stored following, to a degree, data normalization rules. Tables are grouped together by subject areas that reflect general data categories, such as data on customers, products, finance, etc. Dimensional approaches can involve normalizing data to a degree.

Dimensional data warehouses and data marts sometimes use tables logically arranged in a star schema or snowflake schema. The snowflake schema is represented by centralized fact tables that are connected to multiple dimension tables or dimensions are normalized into multiple related tables or sub-dimension tables. Each dimensional table represents a data dimension of the warehouse. All the data for a data dimension can be stored in the associated dimension table, or can be stored in one or more master tables associated with the dimension table. A typical objective when using the snowflake schema is to remove low cardinality attributes from a dimension table and place these attributes in a secondary dimension table.

In a snowflake schema, the master tables can all be directly connected to an associated dimension table, or can be arranged more elaborately with multiple levels of master tables arranged connected in parent and child relationships, and where child tables may have multiple parent tables, thus resulting in a complex snowflake like arrangement. The term "Master Data" means the enterprise-spanning set of data arising or processed within all of the enterprise's primary business entities and functions. For example, in supply chain applications, master data includes product identifiers and details, suppliers, components, inventory, costs, and so on.

A Systems, Applications and Products in Data Processing (SAP), business intelligence warehouse, available from SAP America, Inc., is a data warehouse system that fully utilizes snowflake schema, enabling users to analyze data from operative SAP applications, as well as other business applications. In this context, OLAP technology enables multi-dimensional analysis from various business perspectives.

When a query to a dimensional data warehouse is based on data stored in a master table, the master table is searched to obtain the master table identifier for the data. The master table identifier is often referred to as a surrogate identifier (SID). Once the surrogate identifier for the data has been obtained, data to fulfill the query can be obtained from tables in the data warehouse. This data may be located, for example, in a fact table, one or more dimension tables, and one or more master tables. When a master table is large, searching through the master table to obtain a surrogate key or identifier can be a relatively time consuming process. Though the sheer volume can be very high, the proper organization of data can be helpful to ensure timely retrieval of valuable information.

SUMMARY

In accordance with embodiments of the present invention, a master table within a data warehouse includes surrogate identifiers. Each surrogate identifier (SID) is associated with data inside the master table. A dimension table uses the surrogate identifiers to link to the master table domains. A SID generator uses first data supplied in a user query to generate a first SID indicating location of a particular master table domain in the master table. The SID generator generates the first SID without accessing the master table.

DESCRIPTION OF THE EMBODIMENT

Figure 1:
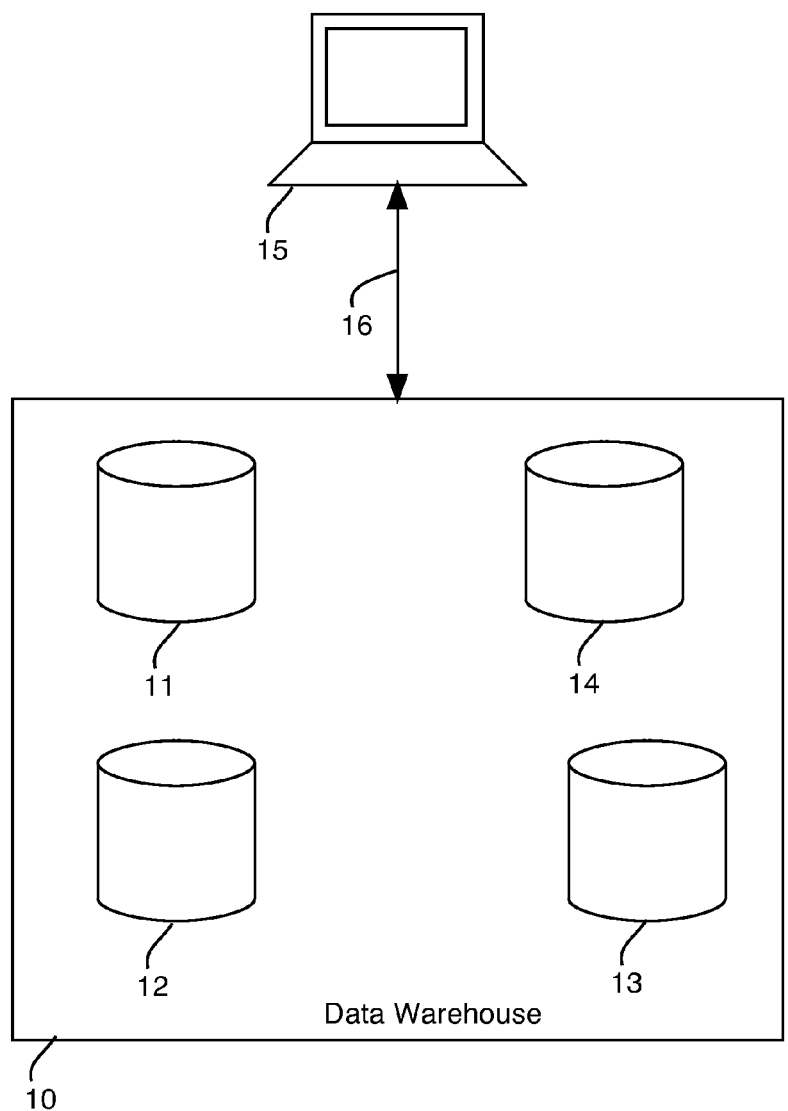
FIG. 1 is a simplified block diagram illustrating a computing system making queries to a data warehouse.

FIG. 1 is a simplified block diagram illustrating connection of a computer system 15 with a data warehouse 10. A data warehouse is organized to meet the need for reliable, consolidated, unique and integrated reporting and analysis, at different levels of aggregation, of the data for an organization. A data warehouse is typically made up of a collection of one or more data repositories. This is illustrated in FIG. 1 by data warehouse 10 including a data repository 11, a data repository 12, a data repository 13 and a data repository 14. For example, data repository 11 includes customer details, data repository 12 includes employee files, data repository 13 includes sales and manufacturing information, data repository might 14 includes financial data, and so on.

Data warehouse 10 integrates the data system to facilitate the answer of data queries from a user of the data warehouse. This is illustrated in FIG. 1 by arrow 16 which represents a user on computer 15 making a query into data warehouse 10 and obtaining a reply.

Figure 2:
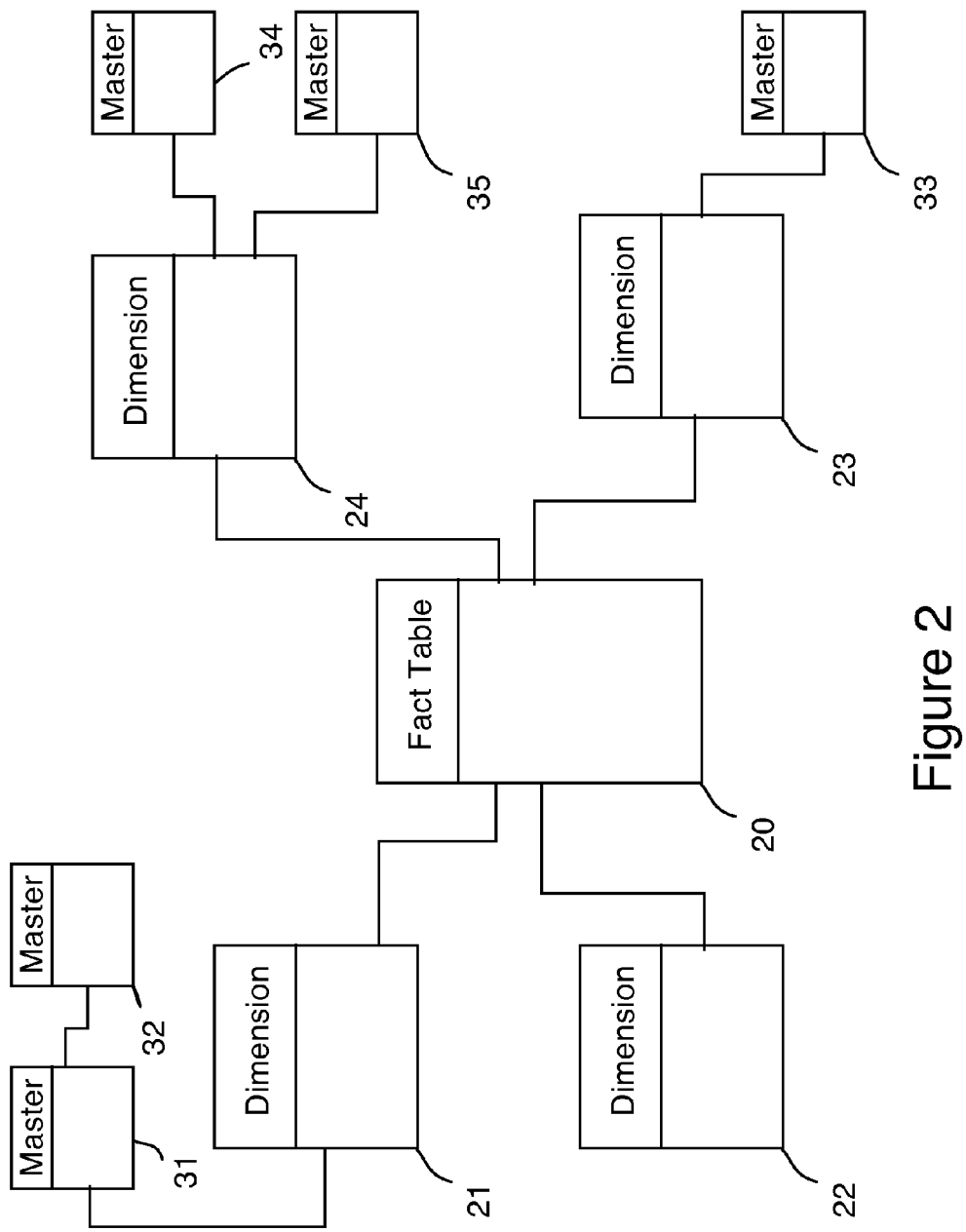
FIG. 2 shows data in data warehouse being arranged in a multiple dimensional snowflake schema.

FIG. 2 gives additional information about how data warehouse 10 is organized. In this example, data warehouse 10 is organized in a snowflake schema. In the snowflake schema a centralized fact table 20 is connected to multiple dimension tables, represented in FIG. 2 by a dimension table 21, a dimension table 22, a dimension table 23 and a dimension table 24. Each dimensional table represents a data dimension of the warehouse. For example, the dimension represented by dimension table 21 is for the customer information stored in data repository 11. The dimension represented by dimension table 22 is for the employee information stored in data repository 12. The dimension represented by dimension table 23 is for the sales and manufacturing information stored in data repository 13. The dimension represented by dimension table 24 is for the financial information stored in data repository 14.

While dimension tables can store user generated data, often times dimension tables are used primarily to store surrogate identifiers that point to user data stored in the master tables associated with the dimension table. For example, customer information is stored in a master table 31 and a child master table 32 of master table 31, not directly in dimension table 21. Sales and manufacturing information is stored in a master table 33. Financial information is stored in a master table 34 and a master table 35.

It is not necessary for every dimension of a data warehouse to utilize master tables. For example, all the employee information is stored in dimension table 22.

FIG. 2 is only meant to be illustrative of the organization of a data warehouse. A typical data warehouse may be much more complex than is shown by FIG. 2 while still conforming to the overall snowflake schema represented in FIG. 2.

In a typical snowflake schema, each data entry in a fact table will reference one or more dimension identifiers (DIM IDs) into a dimension table data entry. Each data entry in a dimension table will be stamped for identification with a DIM ID and will contain one or more surrogate identifiers (SIDs) into a master table data entry. Each data entry in a master table will be stamped for identification with an SID and will contain data entries such as attributes, navigational attributes, compound attributes, hierarchy IDs and text IDs.

Figure 3:
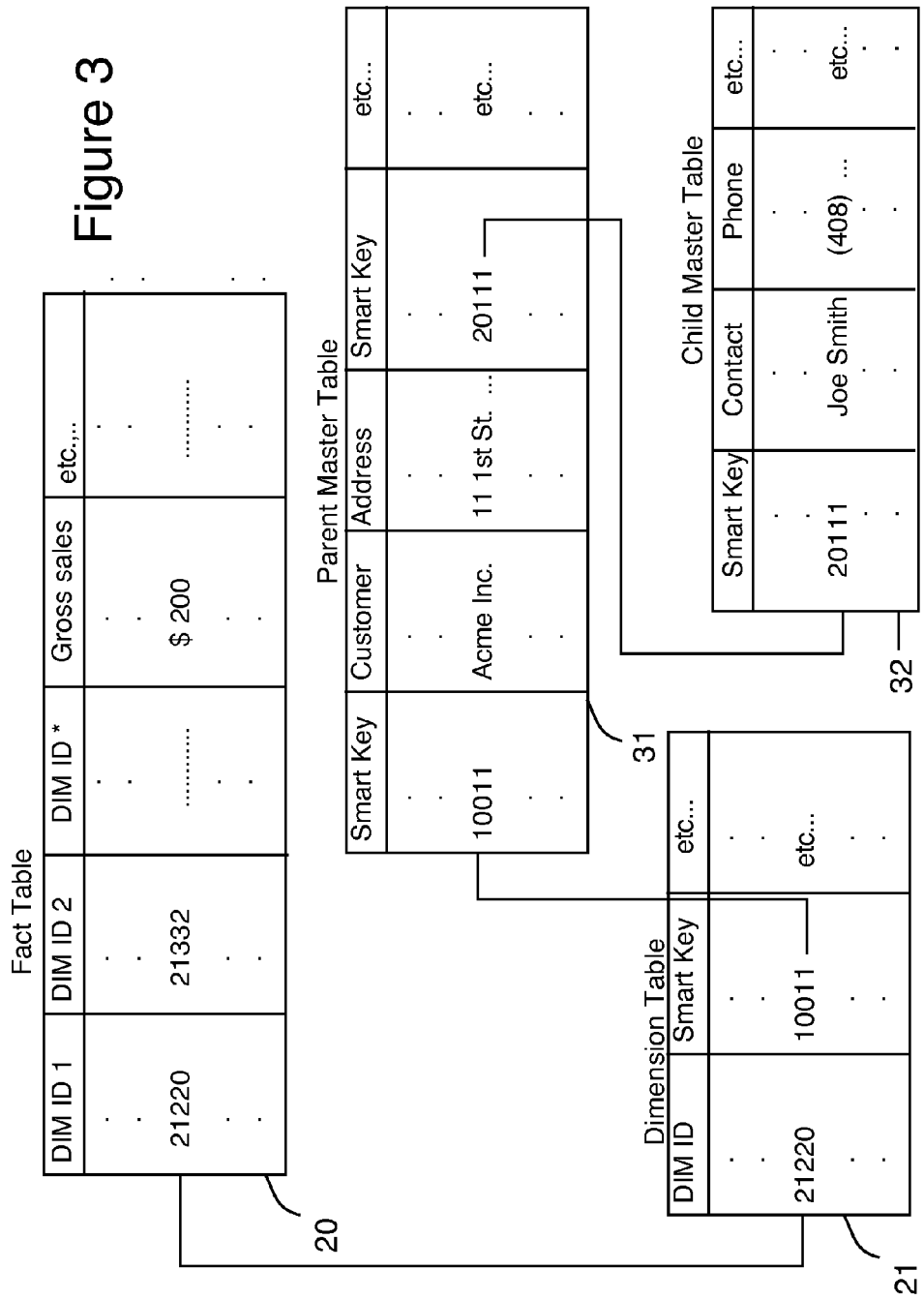
FIG. 3 is a simplified example of data stored in a data warehouse in accordance with an embodiment of the invention.

FIG. 3 is a simplified example of data stored in data warehouse 10. In the specific case shown in FIG. 3, master table 31 is shown to contain specific information about customers such as the name of the customer, the city in which the customer is located, customer address and so on. Fact table 20 is shown to contain DIM IDs. The DIM IDs point to a row in a dimension table, such as dimension table 21.

Dimension tables can include data, or more typically in a snowflake schema, SIDs, that point to data locations in master tables. In embodiments of the present invention, SIDs are implemented using smart key SIDs. Smart key SIDs differ from typical SIDs in that smart key SIDs are generated based on data identifiers which a user of data warehouse 10 uses to uniquely identify data.

For example, if the user identifies customers using a customer ID, data warehouse 10, rather than just assigning an SID for the customer ID, generates a smart key SID that is specifically based on the customer ID. In the simplest case, if the customer ID has an appropriate format, the smart key SID can just be assigned to be the customer ID. For example, when the customer is numeric such as an integer value, the customer ID can be treated as the smart key ID. Otherwise, some predetermined methodology is used to generate a smart key SID from the customer ID. This may, for example, be the use of an ASCII table to generate a smart key SID from a customer ID, perhaps by performing an ASCII encoding of a portion or all of the customer ID. Alternatively, a smart key SID can be generated by subtracting the customer ID from a predetermined number or by using average number of lower and higher values of expected customer ID and subtracting customer ID number from the average number to obtain a plus or minus difference number. All data with a positive difference number smart key ID can be stored in a dimension or database table and all data with a negative difference number smart key ID can be stored in a separate dimension or database table in order to facilitate the data read process and obtain faster query results. Alternatively, a smart key SID can be generated by use of some other conversion technique or mathematical formula that will result in the generation of a unique smart key SID for each unique customer ID.

Smart key SIDs are initially generated whenever master tables are populated with data. Whenever a conventional SID would ordinarily be stored as part of a data entry in a master table, a smart key SID is generated instead and stored with the data entry. While a conventional SID can be auto-generated, for example as sequential incremented numbers, a smart key SID will be a unique, meaningful and accurate representation of the master data value.

Each smart key SID uniquely identifies a master table domain within a master table. What is meant by a master table domain is the data attributes, or details, associated with a master data object. For example, when the master table domain is "customer" the data attributes or details about a customer may include, for example, city, address, zip code, customer profile, etc. For example, when the master table domain is "manufacturing part", the data attributes or details about the manufacturing part may include, for example, part number, color of material, length, width, etc. A master table domain, therefore, accommodates all the attributes or details that are stored together in a master table and uniquely identified by a smart key SID for the master table domain. All master tables, whether the master table is a parent master table or a child master table or a grandchild master table, etc., includes master table domains, each of which is uniquely identified by a smart key SID.

Figure 4:
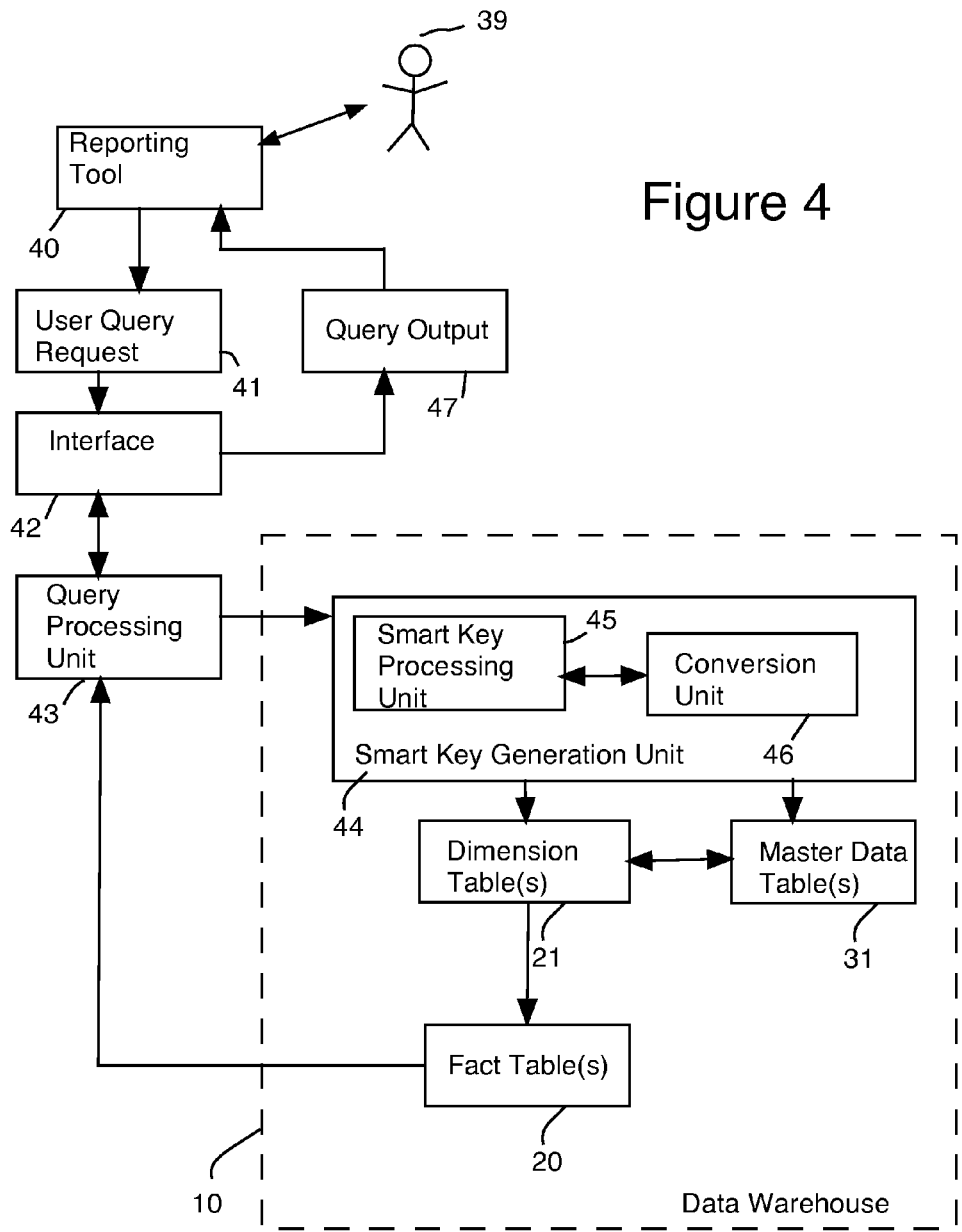
FIG. 4 illustrates processing of a query using a smart key surrogate identifier in accordance with an embodiment of the invention.

FIG. 4 illustrates how data warehouse processes a query using a smart key SID. Smart key SID is generated, for example, by a smart key generation unit 44. It is therefore no longer necessary to search a master table to obtain an SID. For example, if the smart key SID is located in master table 31, it is not necessary to search master table 31 for the smart key SID. Instead, the query can directly reference an entry in dimension table 21 with the smart key SID. Likewise, if the smart key SID is located in child master table 32, it is not necessary to search child master table 32 for the smart key SID. Instead, the query can directly reference an entry in master table 31 with the smart key SID.

The generation of the smart key SID by smart key generation unit 44 saves a search through a master table to obtain a surrogate identifier data identified by the search query. This can save significant time where there is a large amount of data stored in a master table. For example, a typical business query may have many selections such as customer, material, account and so on. When selections are each in a master data category, the selections are stored in different master data tables. If a query has three selections in different master data categories, this would require obtaining three SIDs from three different master tables when there is no smart key SID generation. When smart key SID generation is used, all three smart key SIDS can be dived from smart key generation unit 44. Smart key SID generation, therefore, allows for much faster processing of the query.

As illustrated by FIG. 4, a business user 39 executes a query 41 using a reporting tool 40. An interface 42 receives user query request 41 and passes it to a query processing unit 43. Query processing unit 43 processes query request 41, interprets user data requests into a technical request by building a coding logic using software programming logic such as Structured Query Language (SQL) statements and forwards the technical request to data warehouse 10. Data identifier values from query request 41 are incorporated into the technical request. In order to obtain the information requested by the query, smart key generation unit 44 determines a smart key SID for any data requested in the query. Smart key generation unit 44 utilizes a smart key processing unit 45 and a conversion unit 46 to generate the smart key SID.

Smart key processing unit 45 receives technical requests from query processing unit 43. Smart key processing unit 45 substitutes data identifier values incorporated into the technical requests with smart key SID values. Based on the resulting newly formed technical requests, data is fetched from various tables within data warehouse 10. As necessary, smart key processing unit 45 utilizes conversion unit 46 to assist in transforming or converting a data identifier a the technical request to a unique smart key SID that identifies a master table domain. Conversion unit 46 accepts and interprets technical requests received from smart key processing unit 45. Conversion unit performs conversions to obtain unique smart key SIDs that uniquely identify a master table domain. Once the conversion is complete, conversion unit 46 passes the smart key SID back to smart key processing unit 45.

For example, conversion unit 46 is a look-up table or an algorithm used in generating the smart key SID. In the case where the smart key SID has been directly assigned values identical with an identifier value the user uses to identify data, data conversion 46 would not be needed or would just receive and return the same identifier value. In the case where the smart key SID is generated by an ASCII conversion of some or all of an identifier value the user uses to identify data the data, conversion unit 46 may contain an ASCI conversion table or algorithm to generate a smart key SID for the data.

Smart key generation unit 44 generates all the smart key SIDs necessary to fulfill the data query. Since the smart key SIDs are obtained directly by Smart key generation unit 44, there is no need to obtain the SIDs from the master tables.

For example, consider the example shown in FIG. 3. Suppose a smart key SID for Acme Inc., and smart key SID for Joe Smith were necessary to fulfill user query request 41. The smart key SID 10011 for Acme Inc. is generated by Smart key generation unit 44 allowing a DIM ID associated with smart key SID 10011 to be accessed from dimension table 21 without actually accessing master table 31. If a normal SID had been used, the SID for Acme Inc. would have been obtained by searching master table 31. The use of a smart key SID obviated the search through master table 31.

Likewise, the smart key SID 20111 for Joe Smith is generated by Smart key generation unit 44 allowing a smart key SID identifier 10011 associated with smart key SID 20111 to be accessed from master table 31 without actually accessing child master table 32. If a normal SID had been used, the SID for Joe Smith would have been obtained by searching child master table 32. The use of a smart key SID obviated the search through child master table 32.

Once the data for the query has been obtained from data warehouse 10, the requested data is returned back through query processing unit 43 and interface 42 as a query output 47 received by reporting tool 40.

As shown by the example in FIG. 4, a dimension table can be accessed with a smart key SID to obtain a link directly to requested data within the master table where the requested data is stored. This use of a smart key SID to access a link directly from the dimension table without the necessity of searching the master table for the data can lead to an increase in performance of satisfying queries to a data warehouse.

Figure 5:
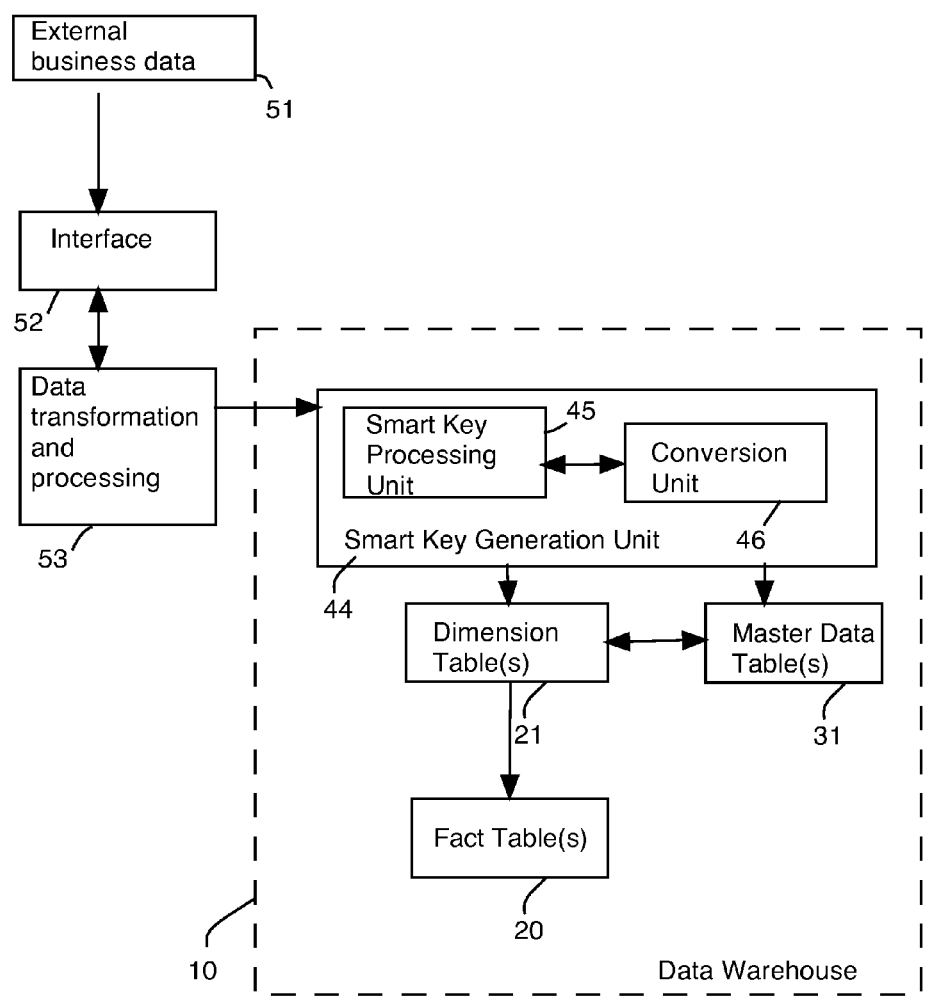
FIG. 5 illustrates processing of a data load and smart key stamp on each master table data entry in accordance with an embodiment of the invention.

FIG. 5 illustrates processing of a data load and smart key stamp on each master table data entry in accordance with an embodiment of the invention. An interface 52 receives external business data 51 and passes it to a data transformation and processing unit 53. Data transformation and processing unit 53 transforms and processes the data before placing the data within data warehouse 10. Smart key generation unit 44 generates a smart key SID for each data entry placed in a master table. The generated smart key will be "stamped" in the relevant data entry. What is meant by "stamped" is that the generated smart key is placed in a master table data entry and used as the primary key or link between an entry in a dimension table and the master table data entry or (when the master table data entry is placed in a child master table) between an entry in a parent master table and the child master table data entry. As described above, smart key generation unit 44 utilizes a smart key processing unit 45 and a conversion unit 46 to generate the smart key SID.

The advantage of using a smart SID can be understood by considering a couple of examples based on user queries to the data warehouse shown in FIG. 3. For example, if gross sales is desired for a customer "Acme Inc.", smart key generation unit 44 will generate a smart key of 10011. The technical request will go to dimension table 21 with the smart key 10011 to obtain DIM ID 21220. The technical request will then go to fact table 20 with DIM ID 21220 to obtain gross sales of $200. Without a smart key, the technical request would have to have gone first to parent master table 31 to obtain an SID to access a DIM ID from dimension table 21.

Also for example, if gross sales is desired for a contact "Joe Smith", smart key generation unit 44 will generate a smart key of 20111. The technical request will go to parent master table 31 with the smart key 20111 to obtain smart key 10011. The technical request will then go to dimension table 21 with the smart key 1011 to obtain DIM ID 21220. The technical request will then go to fact table 20 with DIM ID 21220 to obtain gross sales of $200. Without a smart key, the technical request would have to have gone first to child master table 32 to obtain an SID to access an SID from parent master table 31. In both the above examples, use of a smart key allowed the desired data to be obtained with one less access to a master table.

Also for example, if address and contact phone number are desired for customer "Acme Inc.", smart key generation unit 44 will generate a smart key of 10011. The technical request will go to parent master table 31 with the smart key 10011 to obtain address "11 $1^{st}$ Street." and smart key 20111. The technical request will then go to child master table with smart key 20111 to obtain phone number "(408) . . . ". Without a smart key, the technical request would have to have searched parent master table 31 for a SID for customer "Acme Inc." Use of a smart key allowed direct access of parent master table 31 without having to search parent master table 31 for a SID.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

I claim:

1. A data warehouse comprising:
a data repository that includes hardware;
a master table, wherein the master table including surrogate identifiers initially generated based on data identifiers whenever the master table is populated with data, wherein each surrogate identifier (SID) identifying a master table domain inside the master table, wherein each master table domain accommodates all attributes that are stored together in the master table and is uniquely identified by a corresponding SID;
a dimension table, each entry in the dimension table storing a dimension identifier and a corresponding one or more of the surrogate identifiers to link to the master table domains within the master table;

a fact table, each entry in the fact table referencing a dimension identifier into an entry in the dimension table, wherein the fact table does not include surrogate identifiers and wherein the fact table is not the master table; and, a SID generator, wherein the SID generator, in response to a user query for requested data from the data warehouse, using a data identifier supplied in the user query to generate a particular SID indicating a location of a particular master table domain in the master table, including receiving a technical request with the data identifier and substituting the data identifier with the particular SID based on the data identifier to the particular SID conversion, and wherein the SID generator generating the particular SID without accessing the master table and without accessing the fact table;

wherein the particular SID is used to obtain the requested data from the data warehouse, and the requested data is provided to an originator of the user query without accessing the surrogate identifiers from the master table.

2. A data warehouse as in claim 1, wherein the particular SID is identical to the data identifier supplied in the query.

3. A data warehouse as in claim 1, wherein the SID generator converts at least a portion of the data identifier supplied in the query into ASCII code in order to produce the particular SID.

4. A data warehouse as in claim 1, wherein the SID generator subtracts the data identifier supplied in the query from a preselected number in order to produce particular SID.

5. A data warehouse as in claim 1, wherein data within the data warehouse is formatted in a snowflake schema.

6. A data warehouse as in claim 1, wherein the SID generator uses mathematical formula logic in order to produce particular SID.

7. A computer implemented method for accessing data from a data warehouse comprising:

receiving a user query request for requested data from a data warehouse, wherein the user query request includes a user supplied data identifier;

generating a first surrogate identifier (SID) from the user supplied data identifier, including receiving a technical request with the user supplied data identifier and substituting the user supplied data identifier with the first SID based on the user supplied data identifier to the first SID conversion, wherein the first SID indicating a location of a particular master table domain in a child master table, wherein the child master table being a child of a parent master table and including surrogate identifiers initially generated based on data identifiers whenever the child master table is populated with child master data, wherein each surrogate identifier uniquely identifying a corresponding master table domain that accumulate all attributes stored together in the child master table, wherein the parent master table including different surrogate identifiers initially generated based on different data identifiers whenever the parent master table is populated with parent master data, wherein the parent master data is different from the child master data, wherein the first SID is being generated without accessing the child master table and without accessing a fact table that references a dimension identifier into an entry in a dimension table, wherein the entry in the dimensional table including the dimension identifier and a corresponding one or more of the different surrogate identifiers in the parent master table, wherein the fact table does not include the surrogate identifiers and the different surrogate identifiers, and wherein the fact table is not the parent master table; and, responding to the user query by using the first SID to obtain the requested data from data warehouse and outputting the requested data.

8. A method as in claim 7, wherein generating the first SID includes using the user supplied identifier as the first SID.

9. A method as in claim 7, wherein generating the first SID includes converting at least a portion of the user supplied identifier into ASCII code.

10. A method as in claim 7, wherein generating the first SID includes using mathematical formula logic in order to produce the first SID.

11. A method as in claim 7, wherein generating the first SID includes subtracting the user supplied identifier from a preselected number in order to produce the first SID.

12. A method as in claim 7, wherein data within the data warehouse is formatted in a snowflake schema.

13. A computer implemented method for organizing data in a warehouse comprising:

placing new data in a master table in a warehouse, wherein the master table including surrogate identifiers initially generated based on data identifiers whenever the master table is populated with data, wherein each surrogate identifier (SID) identifying a master table domain inside the master table, and wherein each master table domain accommodates all attributes that are stored together in the master table and is uniquely identified by a corresponding SID;

generating a new surrogate identifier (SID) that uniquely identifies a master table domain of a master table where the new data is stored based on a new data identifier of the new data;

generating an entry in a dimension table in the warehouse storing a dimension identifier and a corresponding one or more of the surrogate identifiers to link to the master table domains within the master table;

generating an entry in a fact table in the warehouse that references the dimension identifier into the entry in the dimension table, wherein the fact table does not include surrogate identifiers and wherein the fact table is not the master table;

receiving a user query for requested data in the warehouse, wherein the user query includes a user supplied data identifier;

generating a particular SID indicating location of a particular master table domain in the master table, in response to the user query, including receiving a technical request with the user supplied data identifier and substituting the user supplied data identifier with the particular SID based on the user supplied data identifier to the particular SID conversion;

wherein the particular SID is generated without accessing the master table and without accessing the fact table; and wherein the particular SID is used to obtain the requested data from the warehouse, and the requested data is provided to an originator of the user query without accessing the surrogate identifiers from the master table.

14. A method as in claim 13 wherein, generating the particular SID includes converting at least a portion of the user supplied identifier into ASCII code.

15. A method as in claim 13, wherein generating particular SID includes subtracting the user supplied identifier from a preselected number in order to produce the particular SID.

16. A method as in claim 13, wherein generating particular SID includes using mathematical formula logic in order to produce the particular SID.

17. A method as in claim 13, wherein generating the particular SID includes subtracting the user supplied identifier from a preselected number in order to produce the particular SID so that all data with a positive difference number SID are stored in a first set of tables and all data with a negative difference number SID are stored in a second set of tables.

\* \* \* \* \*